United States Patent [19]

Hori

[11] Patent Number: 4,504,035
[45] Date of Patent: Mar. 12, 1985

[54] VIBRATION-DAMPED POWER TRANSMISSION DEVICE

[75] Inventor: Masaki Hori, Tokyo, Japan

[73] Assignee: Seiko Giken Kabushiki Kaisha, Tokyo, Japan

[21] Appl. No.: 331,996

[22] Filed: Dec. 18, 1981

[30] Foreign Application Priority Data

Dec. 27, 1980 [JP] Japan .................. 55-158013
Jul. 15, 1981 [JP] Japan .................. 56-109473

[51] Int. Cl.³ .......................................... F16M 13/00
[52] U.S. Cl. .................................. 248/559; 248/624; 248/638
[58] Field of Search ............ 248/638, 559, 624; 188/380, 379; 267/180; 180/312, 70 P

[56] References Cited

U.S. PATENT DOCUMENTS

| 1,819,665 | 8/1931 | Wiltse | 188/380 |
| 2,091,842 | 8/1937 | West | 267/180 X |
| 2,586,646 | 2/1952 | Graham | 267/180 X |
| 3,084,009 | 4/1963 | Heym | 188/380 X |
| 3,172,630 | 3/1965 | Goodman | 248/638 X |
| 4,373,602 | 2/1983 | Tomita | 248/638 |

FOREIGN PATENT DOCUMENTS

| 97937 | 6/1982 | Japan | 188/380 |
| 90213 | 6/1982 | Japan | 180/312 |
| 13240 | 1/1983 | Japan | 267/180 |
| 426084 | 10/1974 | U.S.S.R. | 248/559 |

*Primary Examiner*—J. Franklin Foss
*Attorney, Agent, or Firm*—Wood, Dalton, Phillips, Mason & Rowe

[57] ABSTRACT

A vibration-damped power transmission device adapted to transmit power from a prime mover such as motor, internal combustion engine and the like, which causes a vibratory motion, to a driven body, said power transmission device being supported on a support frame which is to be prevented from vibration, characterized in that at least two vibration dampers are disposed between the housing of said power transmission device and said support frame, said vibration damper comprises a mandrel, a mass member having a cylindrical inner surface enclosing said mandrel, and at least one damping coil spring inserted between said mandrel and said cylindrical inner surface, each of said springs consisting of at least one small coiled portion engaged with or fixed to said mandrel, at least one large coiled portion engaged with or fixed to said cylindrical inner surface and at least one conically and spirally coiled portions integrally connecting said small coiled portion and said large coiled portion.

3 Claims, 40 Drawing Figures

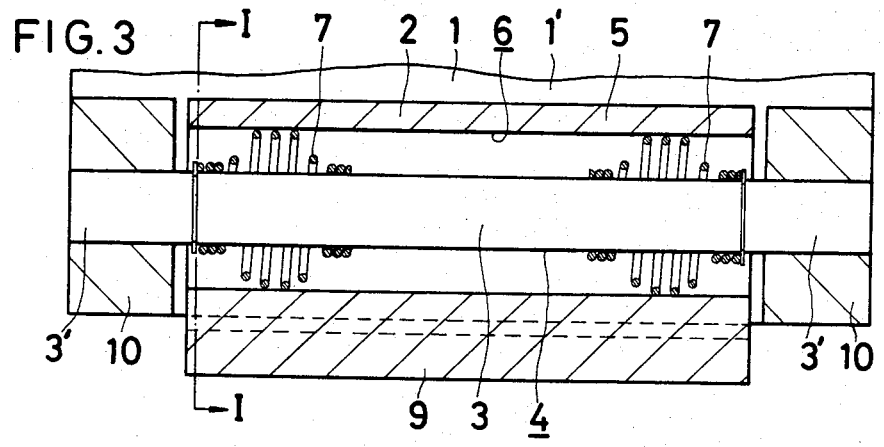
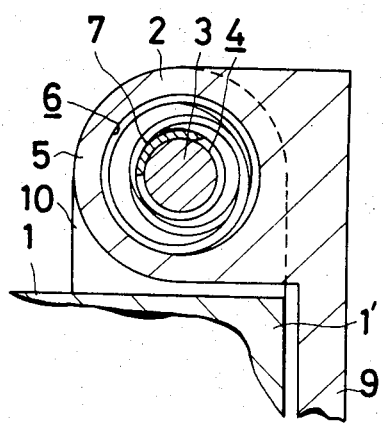
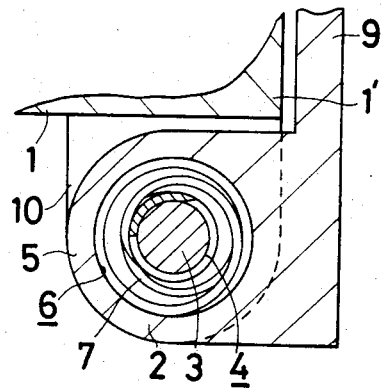

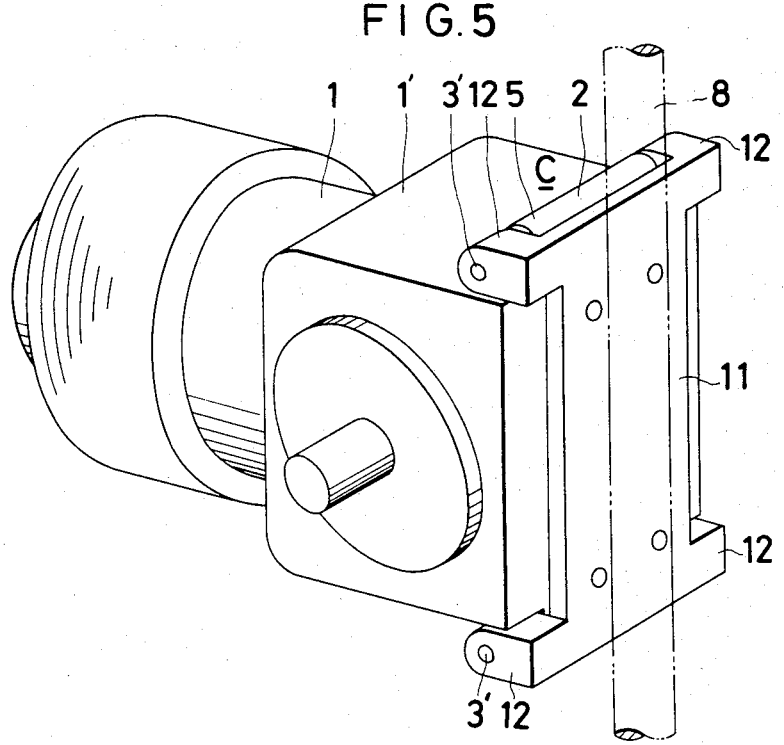

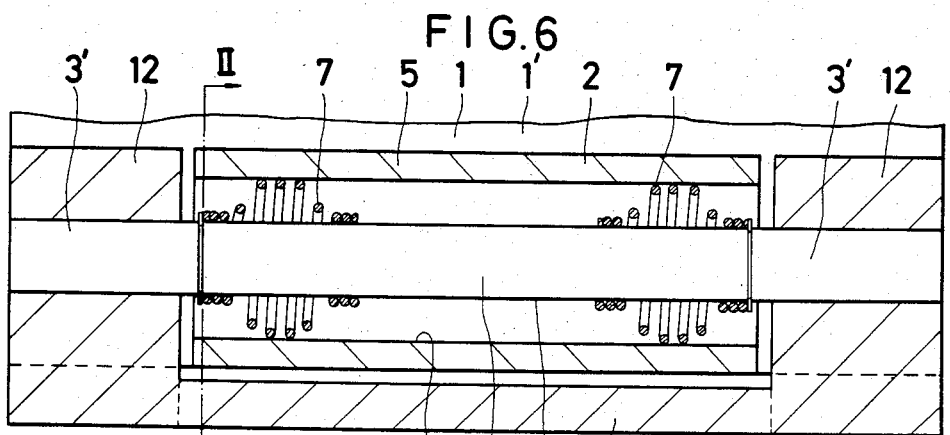
FIG.6
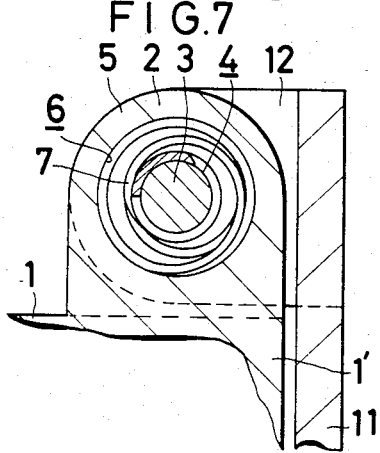
FIG.7
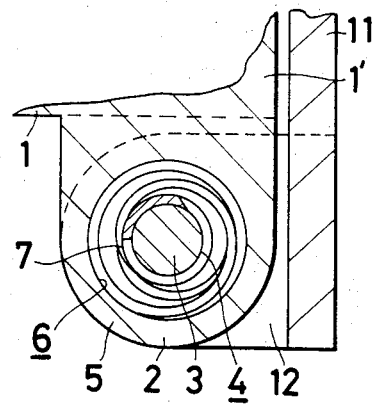

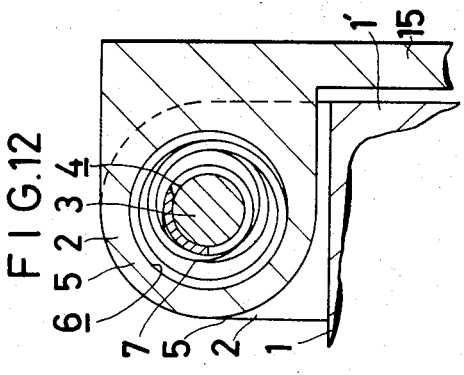
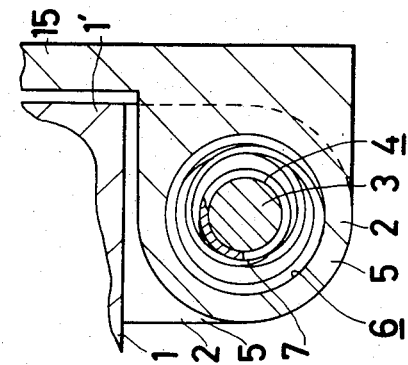
FIG.12
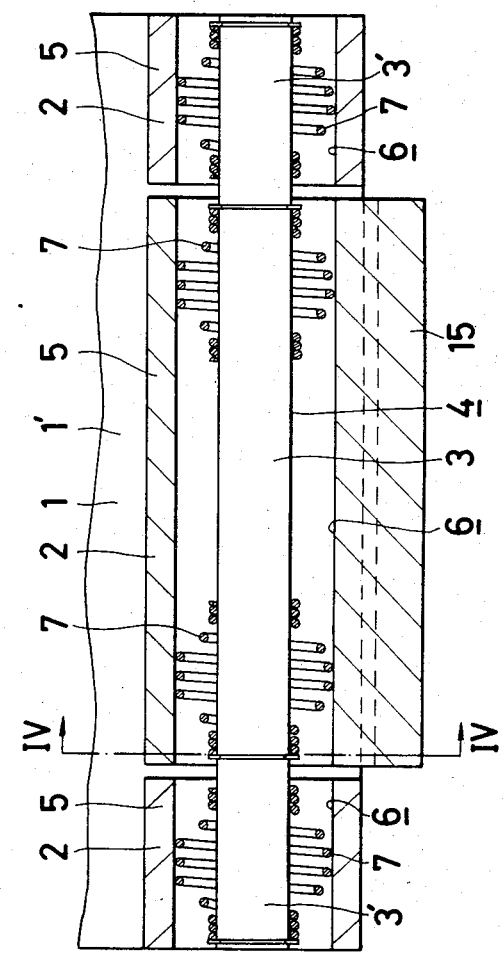
FIG.11

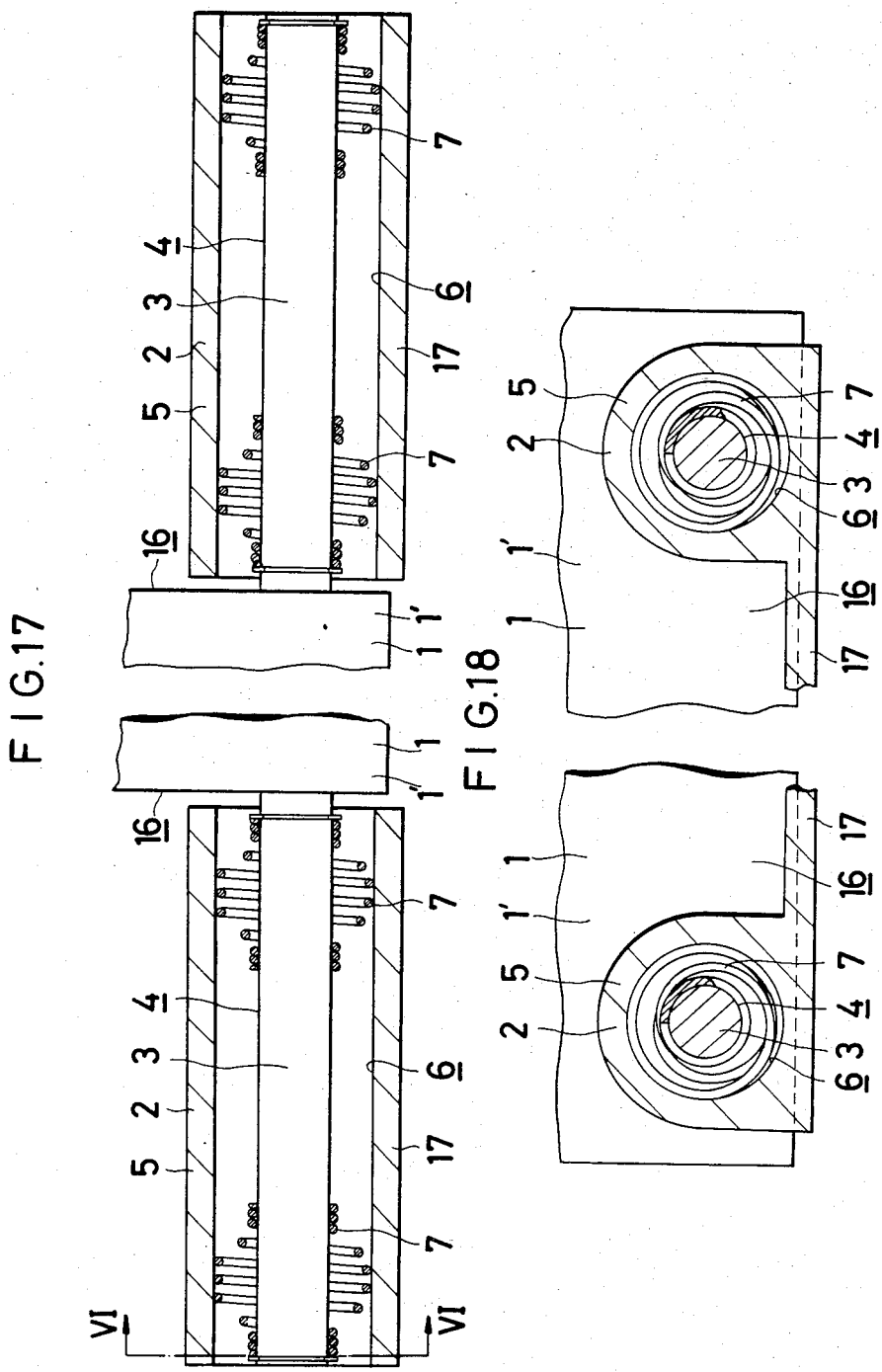

VIBRATION-DAMPED POWER TRANSMISSION DEVICE

BACKGROUND OF THE INVENTION

The present invention relates to a vibration-damped power transmission device, and more particularly to a vibration-damped power transmission device for transmitting power from a prime mover such as motor, internal combustion engine and the like, which is a source of vibration.

The power transmission device for a prime mover such as internal combustion engine or the like transmits vibratory energy from the prime mover to the support frame such as the frame of a motorcycle or other vehicle when the transmission device is directly mounted on the support frame. Consequently, vibrations from the source are immediately transmitted to the support frame, vibrating the body of a driver, making him uncomfortable and sometimes imparing his health after a long period of use. Attempts have heretofore been made to isolate the vibrations from the prime movers and their transmission devices but there has been no satisfactory solution proposed yet.

BRIEF SUMMARY OF THE INVENTION

It is, therefore, an object of the invention to provide a vibration-damped transmission device for a prime mover such as motor, internal combustion engine and the like, whereby vibrations from the source are prevented from transmitting to the support frame such as motor cycle or the like.

Briefly, the present invention provides a vibration-damped power transmission device adapted to transmit power from a prime mover such as internal combustion or motor to a driven body such as the rotating shaft of a motorcycle wheel. The vibration from the prime mover is prevented from transmitting to the support frame such as frame of a motorcycle by at least two vibration dampers inserted between the housing of the transmission device, which may support the prime mover, and the support frame. The vibration damper comprises a mandrel, a mass member having a cylindrical inner surface enclosing or surrounding said mandrel and one or more damping springs inserted between the mandrel and the cylindrical inner surface. In one embodiment, each damping spring consists of a small coiled portion fixed to or engaged with the mandrel, a large coiled portion fixed to or engaged with the inner cylindrical surface and a conically and spirally coiled portion integrally connected with said small and large coiled portions. In another embodiment, each damping spring includes two small coiled portions, one large coiled portion and two conically and spirally coiled portions.

With the vibration damper as constructed according to the present invention, the vibrations from the engine or the like, which would otherwise be transmitted through the transmission device, are substantially damped or absorbed.

The invention will now be described in details in the following, making reference to the accompanying drawings.

BRIEF EXPLANATION OF THE DRAWINGS

FIG. 3 is an enlarged horizontal cross sectional view of the portion B of FIG. 2;

FIG. 4 is a partly broken cross sectional view taken along the line I—I of FIG. 3;

FIG. 5 is a perspective view of another embodiment of a vibration-damped power transmission device;

FIG. 6 is an enlarged horizontal cross sectional view of the portion C of FIG. 5;

FIG. 7 is a partly broken cross sectional view taken along the line II—II of FIG. 6;

FIG. 11 is an enlarged horizontal cross sectional view of the portion D of FIG. 10;

FIG. 12 is a cross partly broken sectional view taken along the line IV—IV of FIG. 11;

FIG. 17 is a partly broken away vertical cross sectional view of a further additional embodiment of the present invention;

FIG. 18 is a partly broken away cross sectional view taken along the line VI—VI of FIG. 17;

DETAILED EXPLANATION OF THE INVENTION

Figure 1:
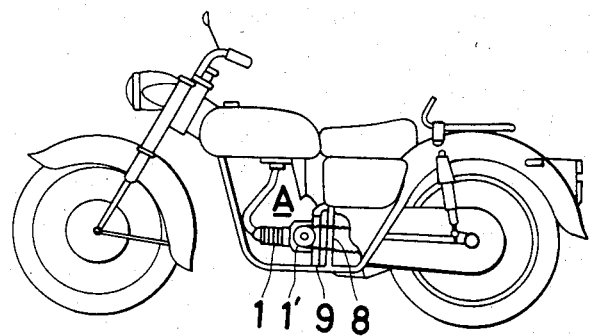
FIG. 1 is a side elevational view of a motorcycle incorporating a vibration-damped power transmission device according to the present invention.

Throughout the entire specification and the drawings, similar portions will be indicated by the same reference numerals unless otherwise stated.

FIGS. 1 through 12 illustrate several embodiments of vibration-damped transmission devices according to the invention, mounted on a vertical member of a motorcycle. As shown in FIG. 1, the motorcycle is provided with a vertical member 8 on which an internal combustion engine 1 and a transmission device 1' thereof are mounted by means of a vertical connecting member 9.

Figure 2:
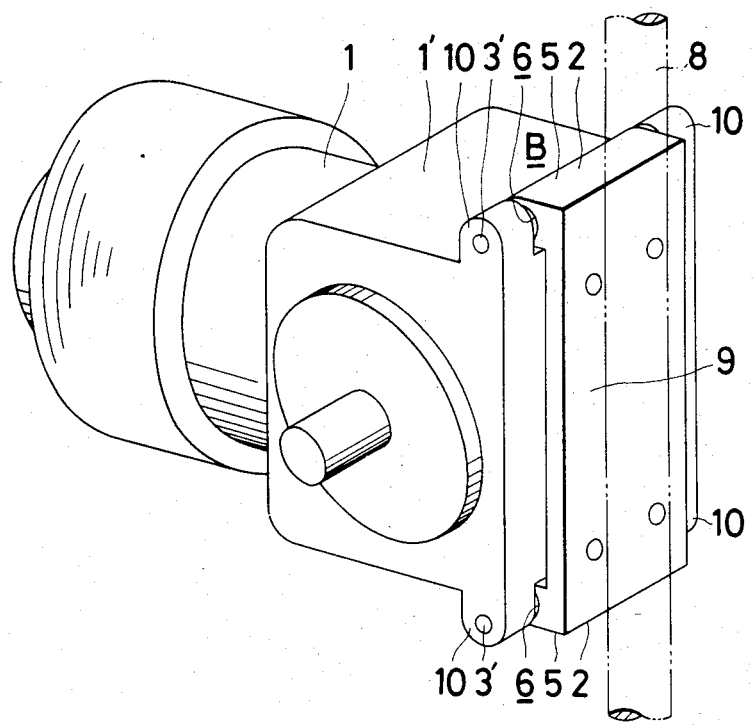
FIG. 2 is an enlarged perspective view of the portion A of FIG. 1.

Referring to FIGS. 2 through 4 which illustrate the first embodiment of the present invention, the transmission device 1' has a horizontal output shaft (not numbered) protruded from one lateral wall of the device 1'. The transmission device 1' is provided with a first pair of aligned protrusions 10,10 at the upper corners and a second pair of aligned protrusions 10,10 at the lower corners. The upper and lower portions of the connecting member 9 and the protrusions 10,10,10,10 constitute a pair of vibration dampers 2,2 according to the present invention. As the vibration damper at the lower portion has substantially the same construction as that at the upper portion, only the upper vibration damper will be described in details. Referring to FIGS. 3 and 4, the protrusions 10,10 have axially aligned bores in which ends 3',3' of a cylindrical mandrel 3 are fixedly supported. The connecting member 9 has a mass member 5 at the upper portion which extends in between the protrusions 10. The mass member 5 has an inner cylindrical wall or surface 6 concentrically disposed about the cylindrical mandrel 3. Disposed between the mandrel 3 and the inner surface 6 of the mass member 5 are a pair of a vibration damping springs 7,7 at locations close to the opposite ends of the mass member 5 and retained by stop rings or other fixing or engaging means on the outer surface 4 of the mandrel 3 and on the inner surface 6 of the mass member 5. The springs 7,7 not only absorb or damp the vibrations transmitted from the engine 1 and the transmission device 1' but also support the weight of them. Accordingly, each spring is made of a spring metal such as steel having a sufficient strength to support the weight. The spring has a construction as illustrated in FIGS. 19 through 21 or FIGS. 29 through 36 depending on the weight to be supported and the application of the vibration damper.

Figure 19:
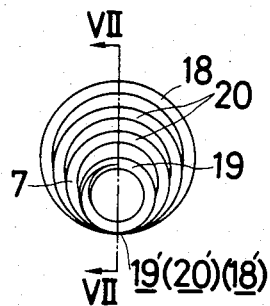
FIG. 19 is an end view of a spring utilized in the present invention.
Figure 20:
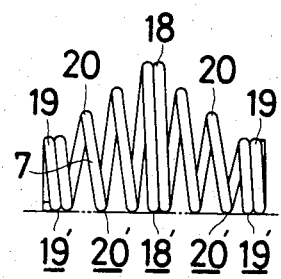
FIG. 20 is a side view of the spring shown in FIG. 19.
Figure 21:
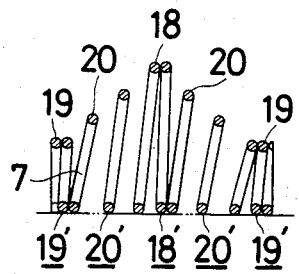
FIG. 21 is a cross sectional view taken along the line VII—VII of FIG. 19.

In FIGS. 19-21, the spring 7 consists of a large coiled portion 18 with close turns, conically and spirally coiled portions 20, 20 with spaced turns and small coiled portions 19,19 with close turns. One sides of these portions 18',20',20',19',19' are aligned in a line to have an upwardly deviated or localized mass distribution. Alternatively, the spring illustrated in FIGS. 29 through 31 may be utilized in which the axis $X_2$ of the large coiled portion 18 is deviated upwardly to a lesser degree from the axis $X_1$ of the small coiled portions 19,19, as compared with the foregoing example, depending on the application.

Referring back to FIGS. 3 and 4, when the weight of the engine 1 and the transmission 1' are supported by the frame 8 and the connecting member 9 by way of the damper 2, the relative arrangement of the various members will substantially assume the position as illustrated in FIGS. 3 and 4 when the spring 7,7 illustrated in FIGS. 19-21 or 29-31 are used in up-side-down position.

Another embodiment is ellustrated in FIGS. 5 through 7, wherein the mass members 5 form parts of the transmission device 1' while the protrusions 12,12,12,12 form parts of the connecting member 11. In this embodiment the mass distribution of the springs 7,7 is deviated upwardly as illustrated in FIGS. 19-21 or FIGS. 29-31.

Figure 9:
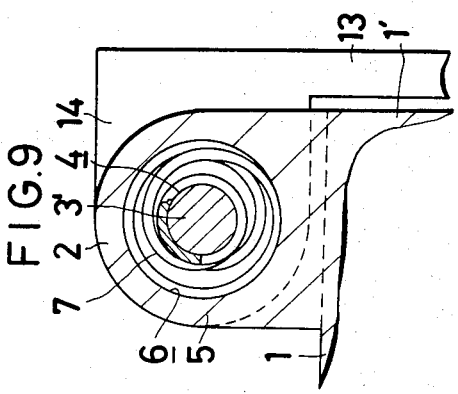
FIG. 9 is a partly broken cross sectional view taken along the line III—III of FIG. 8.
Figure 8:
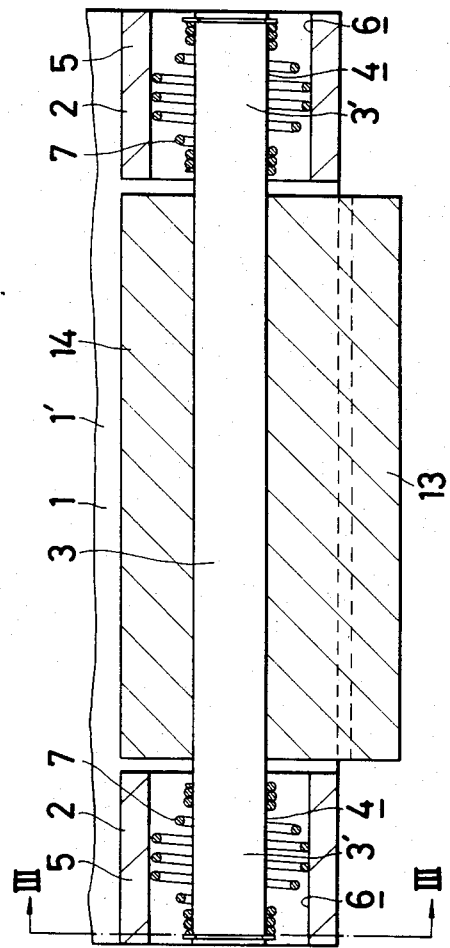
FIG. 8 is a horizontal cross sectional view of a further embodiment of the invention.

A further embodiment is illustrated in FIGS. 8 and 9 wherein the protrusions 14,14 of the connecting member 13 form supports for the mandrel 3 and the mass members 5,5,5,5 form parts of the transmission device 1'. In this embodiment, the ends 3,3' of the mandrel 3 support the transmission device 1' by means of the springs 7,7.

Figure 10:
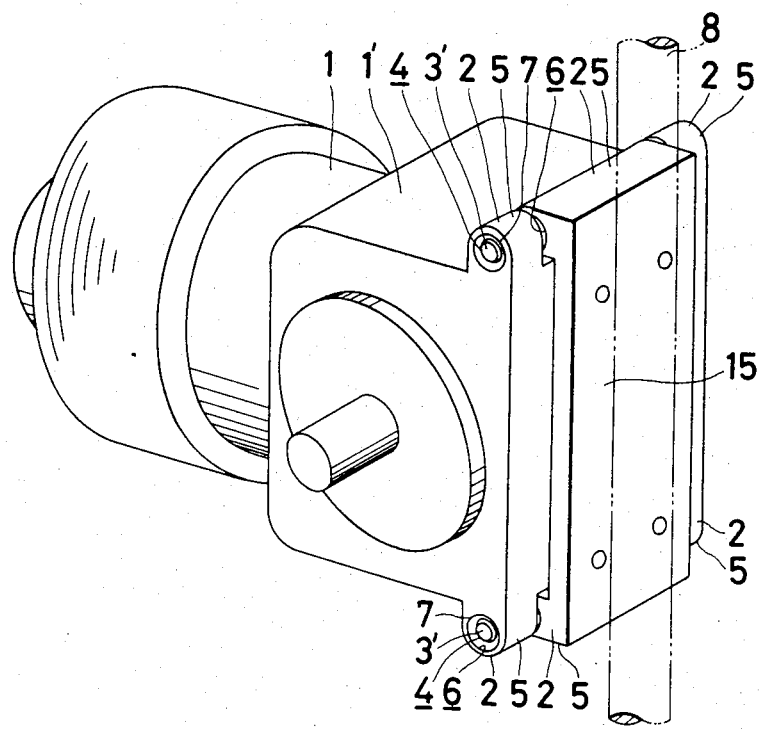
FIG. 10 is a perspective view of a yet further embodiment of the present invention.
Figure 13:
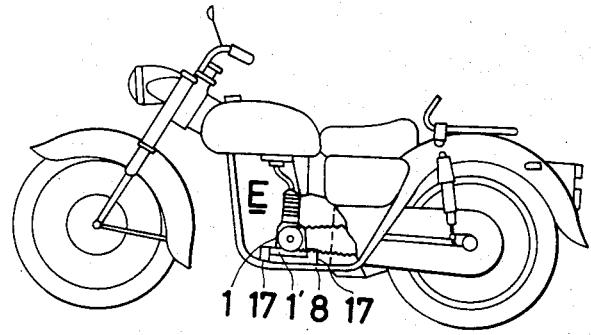
FIG. 13 ia a side elevational view of an additional embodiment of the invention applied to a motorcycle.

FIGS. 10 through 12 illustrate a yet further embodiment, wherein the protrusions of the connecting member 15 form mass members 5,5 and the protrusions of the transmission device 1' also form mass members 5,5,5,5. The transmission device 1' is supported by the ends 3',3' of the mandrel 3 by the outermost pair of springs 7,7 and the mandrel 3 is in turn supported by the connecting member 15 by means of the inwardly located pair of springs 7,7.

FIGS. 13 through 18 illustrate several embodiments applied to a motorcycle wherein the transmission device according to the present invention is supported in horizontal position.

Referring to FIGS. 13 through 16, a pair of connecting members 17, 17 are supported by a horizontal member 8 of the motorcycle. Short mandrels 3,3,3,3 are protruded from lateral surfaces of the transmission device 1' which is integrally formed with an internal combustion engine 1. The horizontal member 17,17 are provided at their ends with mass members 5,5,5,5 which have horizontally extending cylindrical inner surfaces 6,6,6,6 into which the mandrels 3,3,3,3 are protruded. Damping springs 7,7 similar to that illustrated in FIGS. 19-21 or FIGS. 29-31 are disposed and retained between the mandrel 3 and the inner surface 6 of the mass member 5.

Figure 14:
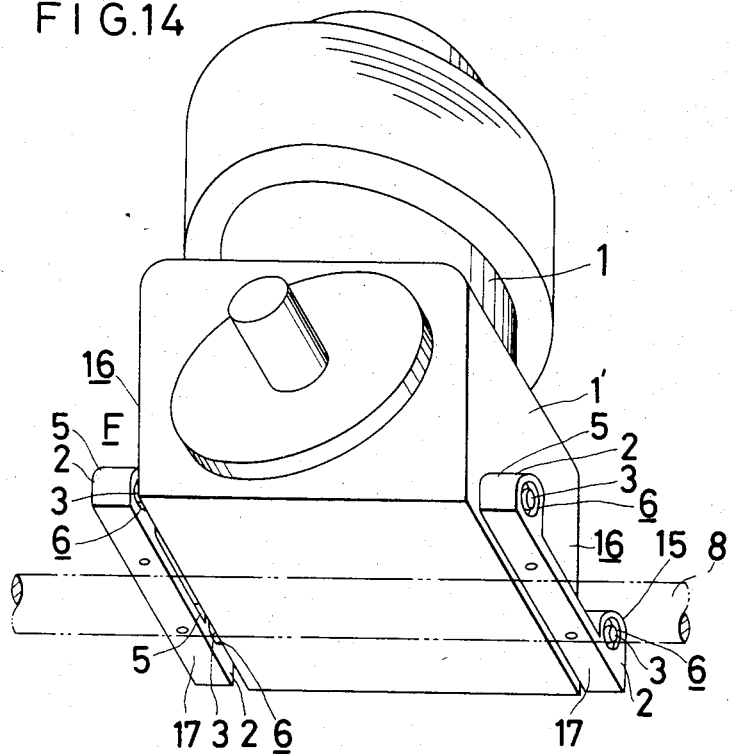
FIG. 14 is an enlarged perspective view of the portion E of FIG. 13.
Figure 15:
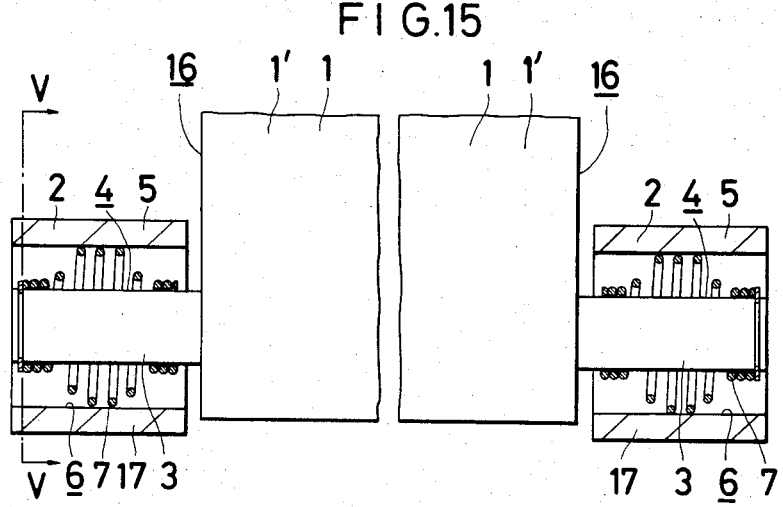
FIG. 15 is a partly broken away enlarged vertical cross sectional view of the portion F of FIG. 14.
Figure 16:
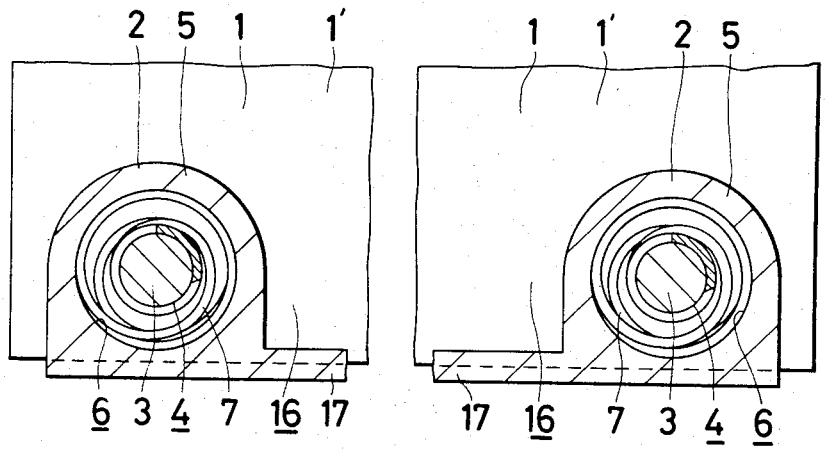
FIG. 16 is a partly broken away cross sectional view taken along the line V—V of FIG. 15.

FIGS. 17 and 18 illustrate another embodiment of a vibration damper which may be replaced with the vibration dampers illustrated in FIGS. 14-16. A pair of damping springs 7,7 are disposed and retained between the mandrel 3 and the inner surface 5 of the mass member 5 of each vibration damper 2 and the small coiled portions and the large coiled portions of the springs are fixed to or engaged with the outer cylindrical surface 4 of the mandrel 3 and the inner surface 6, respectively.

Figure 22:
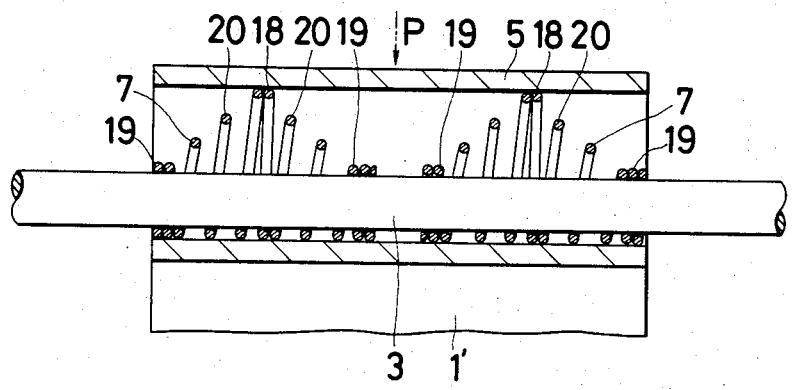
FIGS. 22 and 23 are cross sectional views of an embodiment incorporating the spring shown in FIGS. 19-21, illustrating the damper in use.
Figure 23:
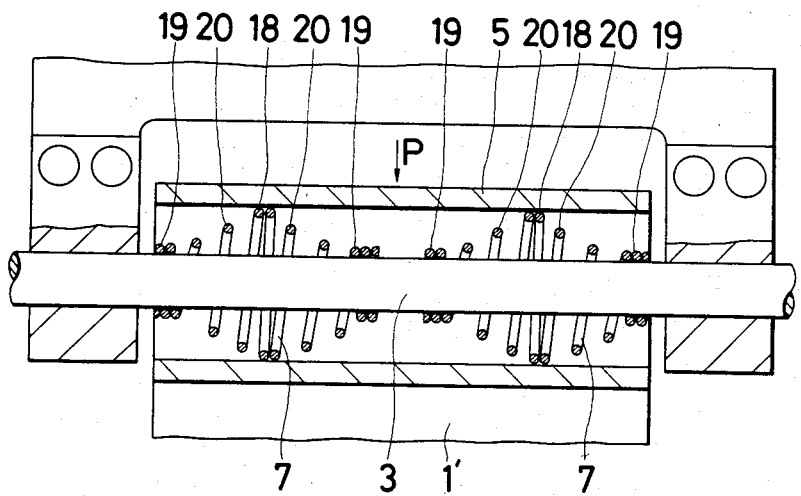

FIGS. 22 and 23 illustrate the use of the spring illustrated in FIGS. 19-21 which have already been described. Assuming that the mandrel 3 is fixed and the weight of the transmission device 1' is not placed on the springs 7,7, the springs will take the natural position as shown in FIG. 22. When a pressure P is applied by placing the weight of the transmission device 1' thereon the springs are pressed down to the position as shown in FIG. 23 and the vibration damper 2 absorbs or damps the vibrations when the engine is operated.

Figure 24:
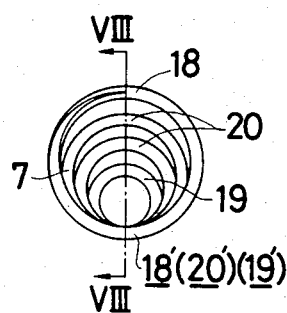
FIG. 24 is an end view of another spring utilized in the present invention.
Figure 25:
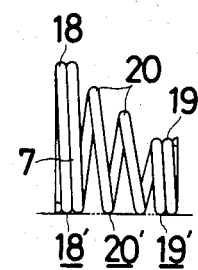
FIG. 25 is a side view of the spring shown in FIG. 24.
Figure 26:
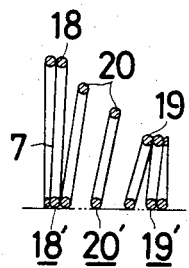
FIG. 26 is a cross sectional view taken along the line VIII—VIII of FIG. 24.
Figure 27:
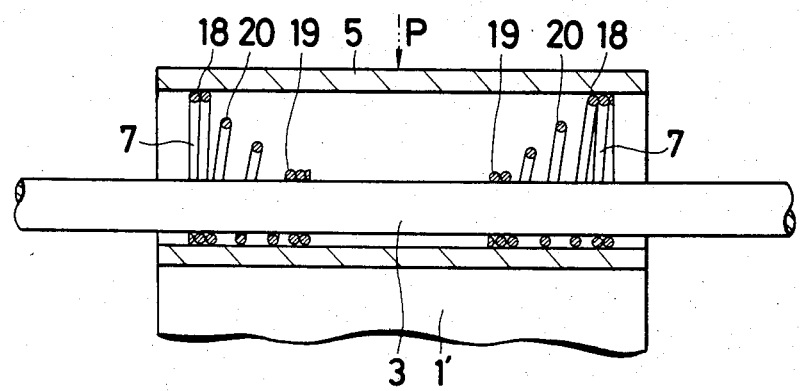
FIGS. 27 and 28 are cross sectional views of an embodiment incorporating the spring shown in FIGS. 24-26, illustrating vibration damper in use.
Figure 28:
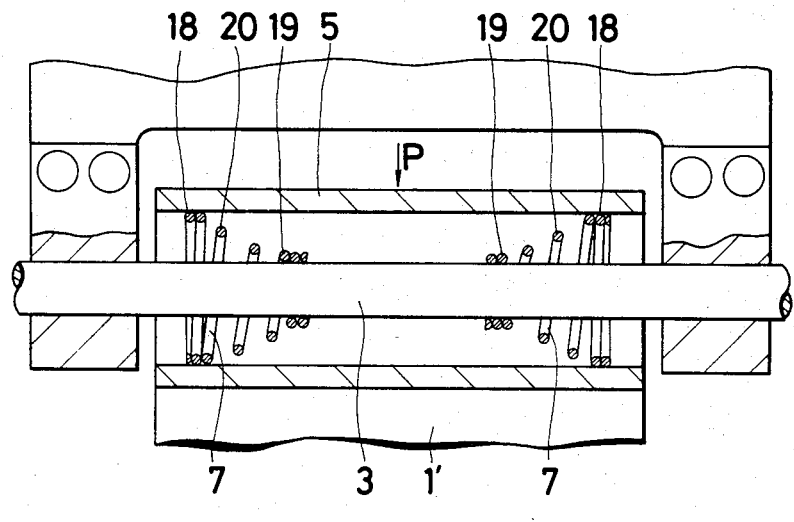
Figure 29:
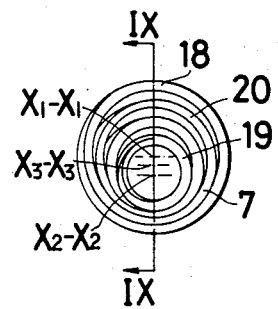
FIG. 29 is an end view of a further spring utilized in the present invention.
Figure 30:
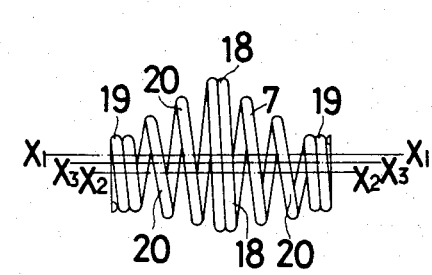
FIG. 30 is a side view of the spring shown in FIG. 30.
Figure 31:
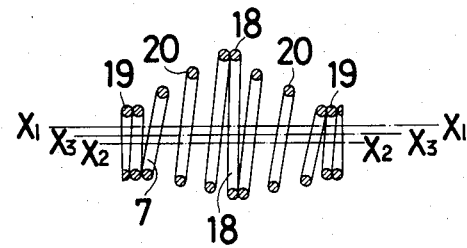
FIG. 31 is a cross sectional view taken along the line IX—IX of FIG. 29.
Figure 32:
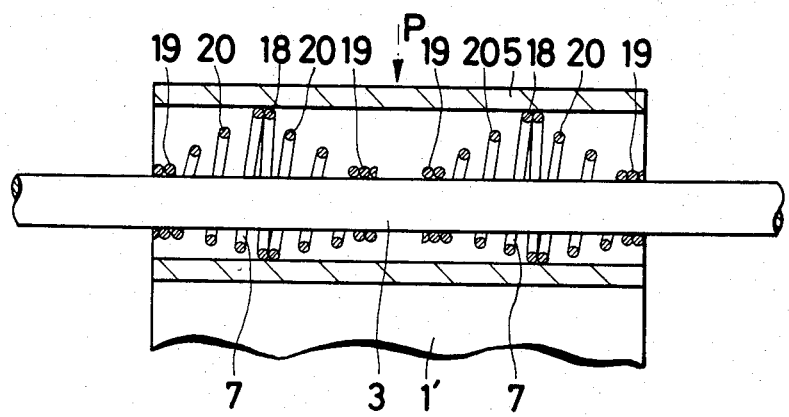
FIGS. 32 and 33 are cross sectional views of a damping device incorporating the spring illustrated in FIGS. 29-31.
Figure 33:
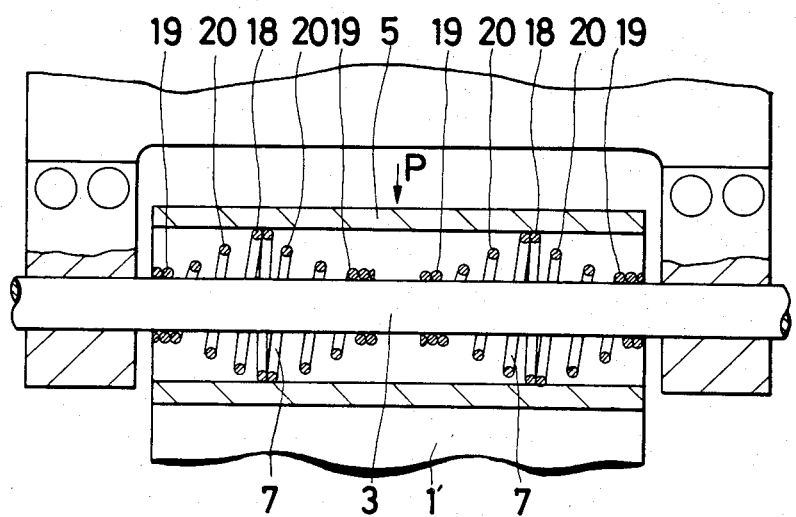

FIGS. 24 through 26 illustrate a still further example of the spring which may be adapted in the present invention, wherein the spring 7 consists of a large coiled portion 18 with close turns and adapted to be fixed or engaged with the inner surface a mass member, a small coiled portion 19 with close turns and adapted to be fixed or engaged with the outer surface of the mandrel and a conically and spirally coiled portion 20 with spaced turns. The mass ditribution is off the axis so that the one sides 18′,19′,20′ of the spring align in a line. FIGS. 27 and 28 illustrate the use of the springs according to FIGS. 24–26, FIGS. 32 and 33 illustrate the use of the spring is illustrated in FIGS. 29–31 which has already been described. The axes $X_1$, $X_2$ and $X_3$ align in a line when supporting the weight of the engine and the transmission device.

Figure 34:
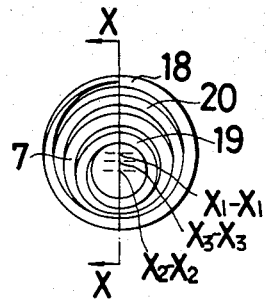
FIG. 34 is an end view of a yet further spring utilized in the present invention.
Figure 35:
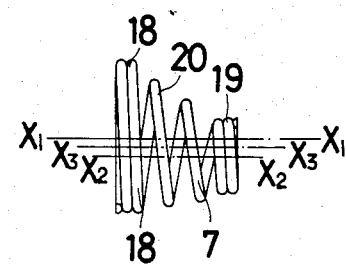
FIG. 35 is a side view of the spring shown in FIG. 34.
Figure 36:
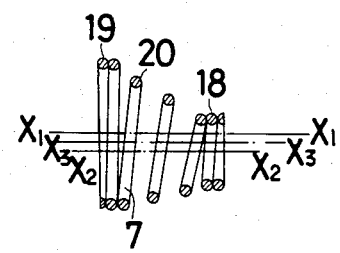
FIG. 36 is a cross sectional view taken along the line X—X of FIG. 34.
Figure 37:
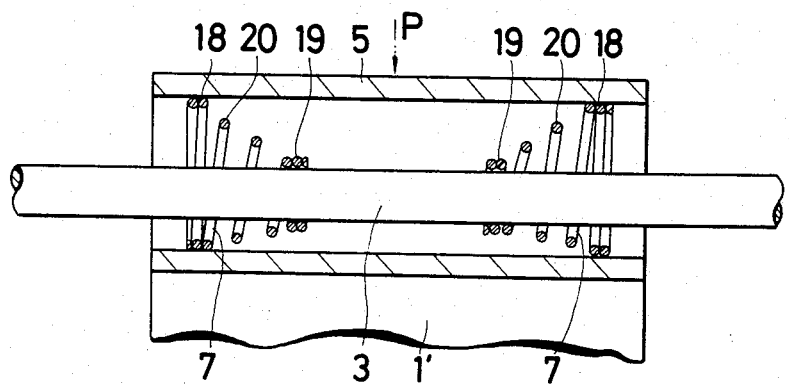
FIGS. 37 and 38 are cross sectional views of a damping device incorporating the spring illustrated in FIGS. 34-36.
Figure 38:
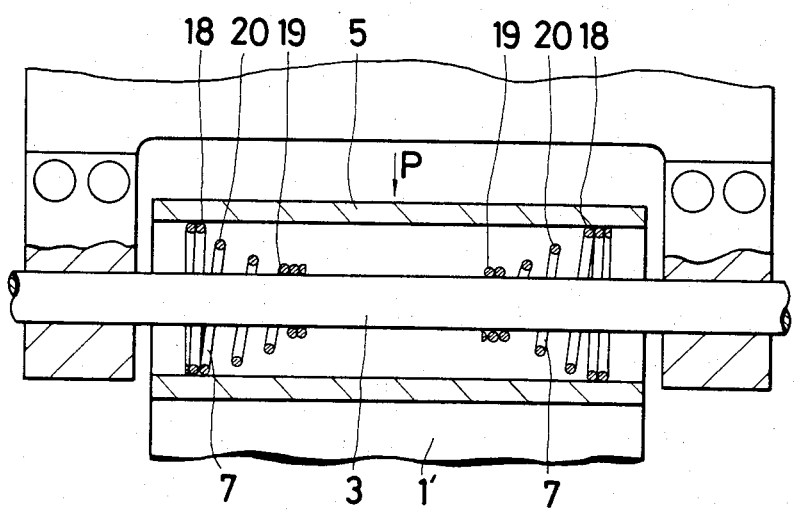

FIGS. 34 through 36 illustrate a modification of the spring illustrated in FIGS. 24–26 and the mass deviation is lessened in this example. FIGS. 37 and 38 illustrate the use of the spring shown in FIGS. 34–36.

Figure 39:
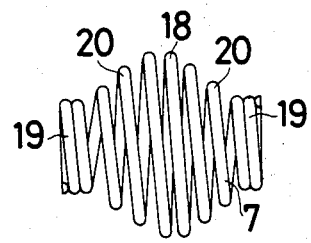
FIGS. 39 and 40 are side views of springs which are prior art springs proposed by the inventor.
Figure 40:
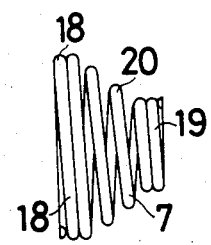

Incidentally, FIGS. 39 and 40 illustrate two forms of the prior art springs which are not employed in the present invention but utilized in copending prior Japanese applications.

It should be noted that there are a member of modifications within the spirit of the present invention.

What is claimed is:

1. A vibration-damped power transmission device adapted to transmit power from a prime mover such as motor, internal combustion engine and the like, which causes a vibratory motion, to a driven body, said power transmission device being supported on a support frame which is to be prevented from vibration, and vibration damper means disposed between the housing of said power transmission device and said support frame, each said vibration damper means comprising:

a horizontally extending mandrel;
 a mass member having a cylindrical inner surface radially surrounding said mandrel; and
 at least one damping coil spring coaxially between said mandrel and said cylindrical inner surface, each said spring consisting of at least one small coiled portion engaged with the outer surface of said mandrel, at least one large coiled portion engaged with said cylindrical inner surface of the mass member, and a conically coiled portion integrally connecting the small coiled portion to the large coiled portion for supporting a load directed transversely to the longitudinal extent of the coil spring.

2. A vibration-damped power transmission device according to claim 1, wherein said damping coil springs are formed from a strong material such as steel.

3. A vibration-damped power transmission device according to claim 1, wherein said damping coil springs are eccentric for improved support of the weight acting transversely across said springs.

* * * * *